No. 661,448. Patented Nov. 6, 1900.
L. GENTY.
ELECTRIC TRACTION OF TRAINS OF VEHICLES UPON RAILS.
(Application filed May 3, 1900.)
(No Model.) 9 Sheets—Sheet 1.

Witnesses:
*S. W. Parker*
*B. N. Tilden.*

Inventor
Lucien Genty
By James L. Norris
Atty.

No. 661,448. Patented Nov. 6, 1900.
L. GENTY.
ELECTRIC TRACTION OF TRAINS OF VEHICLES UPON RAILS.
(Application filed May 3, 1900.)
(No Model.) 9 Sheets—Sheet 2.

Witnesses:
F. N. Parker
B. N. Tilden.

Inventor
Lucien Genty
By James L. Norris
Atty

No. 661,448. Patented Nov. 6, 1900.
L. GENTY.
ELECTRIC TRACTION OF TRAINS OF VEHICLES UPON RAILS.
(Application filed May 3, 1900.)
(No Model.) 9 Sheets—Sheet 3.

Fig. 4.

Witnesses:
W. Parker
B. N. Tilden.

Inventor
Lucien Genty
By James L. Norris
Atty.

No. 661,448. Patented Nov. 6, 1900.
L. GENTY.
ELECTRIC TRACTION OF TRAINS OF VEHICLES UPON RAILS.
(Application filed May 3, 1900.)
(No Model.) 9 Sheets—Sheet 4.

Witnesses:
J. W. Parker
B. N. Tilden

Inventor
Lucien Genty
By James L. Norris.
Atty

No. 661,448. Patented Nov. 6, 1900.
L. GENTY.
ELECTRIC TRACTION OF TRAINS OF VEHICLES UPON RAILS.
(Application filed May 3, 1900.)

(No Model.) 9 Sheets—Sheet 5.

Fig. 7.

Witnesses:

Inventor
Lucien Genty
By James L. Norris
Atty.

No. 661,448. Patented Nov. 6, 1900.
L. GENTY.
ELECTRIC TRACTION OF TRAINS OF VEHICLES UPON RAILS.
(Application filed May 3, 1900.)

(No Model.) 9 Sheets—Sheet 7.

Fig. 9.

Witnesses:
﻿
Inventor
Lucien Genty

By James L. Norris
Atty.

No. 661,448. Patented Nov. 6, 1900.
L. GENTY.
ELECTRIC TRACTION OF TRAINS OF VEHICLES UPON RAILS.
(Application filed May 3, 1900.)
(No Model.) 9 Sheets—Sheet 9.

Fig. 11.

Witnesses:

Inventor
Lucien Genty
By James L. Norris
Atty.

UNITED STATES PATENT OFFICE.

LUCIEN GENTY, OF MARSEILLES, FRANCE.

ELECTRIC TRACTION OF TRAINS OF VEHICLES UPON RAILS.

SPECIFICATION forming part of Letters Patent No. 661,448, dated November 6, 1900.

Application filed May 3, 1900. Serial No. 15,405. (No model.)

*To all whom it may concern:*

Be it known that I, LUCIEN GENTY, engineer, a citizen of France, residing at 61 Rue St. Jacques, Marseilles, Bouches-du-Rhône, France, have invented certain new and useful Improvements in the Electric Traction of Trains of Vehicles upon Rails, of which the following is a specification.

My invention relates to certain improvements in electric traction-railways; and it consists of the sundry combinations of devices substantially as hereinafter more fully disclosed, whereby a single attendant or motorman can readily control at a distance one or more sets of electric motors arranged upon a locomotive-engine or upon a number of cars.

The invention is, moreover, applicable irrespective of the manner in which the electric current is supplied to the train.

The improved arrangement also permits the attendant simultaneously to reverse the direction of rotation of all the motors and afterward also simultaneously to operate all the transmitting devices to vary the connecting up of the motors with each other and with the resistances suited to the different speeds given the train.

The invention will be best understood by reference to the accompanying drawings, in which—

Figure 1:
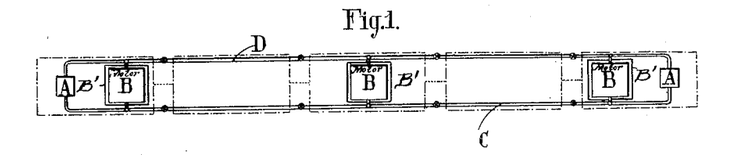
Figure 1 is a diagram indicating the general disposition of the system as applied to the control of a train of five cars.
Figure 2:
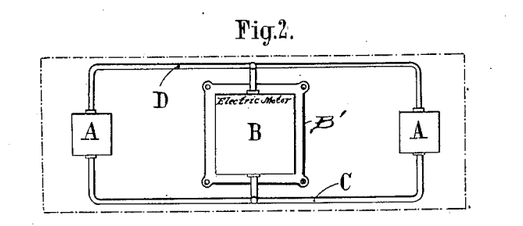
Fig. 2 illustrates the application of the same arrangement to a single locomotive-engine.

The diagram Fig. 1 represents a train of five cars, the two end cars and the central car being provided with electric motors, as at B'. Hence upon each of these three cars there is arranged a receiver or controller of any suitable construction, the three controllers or receivers B being identical. A transmitter A is arranged at each end of the train, so that the train may travel in either direction indiscriminately. The two transmitters are connected with each other by a double-pipe system C and D, the pipes being arranged on the right and left of the train upon each of the cars provided with suitable coupling devices, the receiver or controller being connected to both pipes C and D. It will readily be seen without any need to enter into a detailed description of the operation of the system that the latter is applicable to a single car, if required. This alternative is dealt with in the diagram Fig. 2 the result of such an arrangement being an electric locomotive capable of being set in motion in either direction by means of a single receiver or controller located in the center and an electric motor B'. It may here be pointed out that this controller could, but with difficulty, be operated directly by hand, inasmuch as the controllers herein contemplated are intended to distribute several hundred volts of electricity, and consequently necessitate the use of considerable force for their operation.

Figure 3:
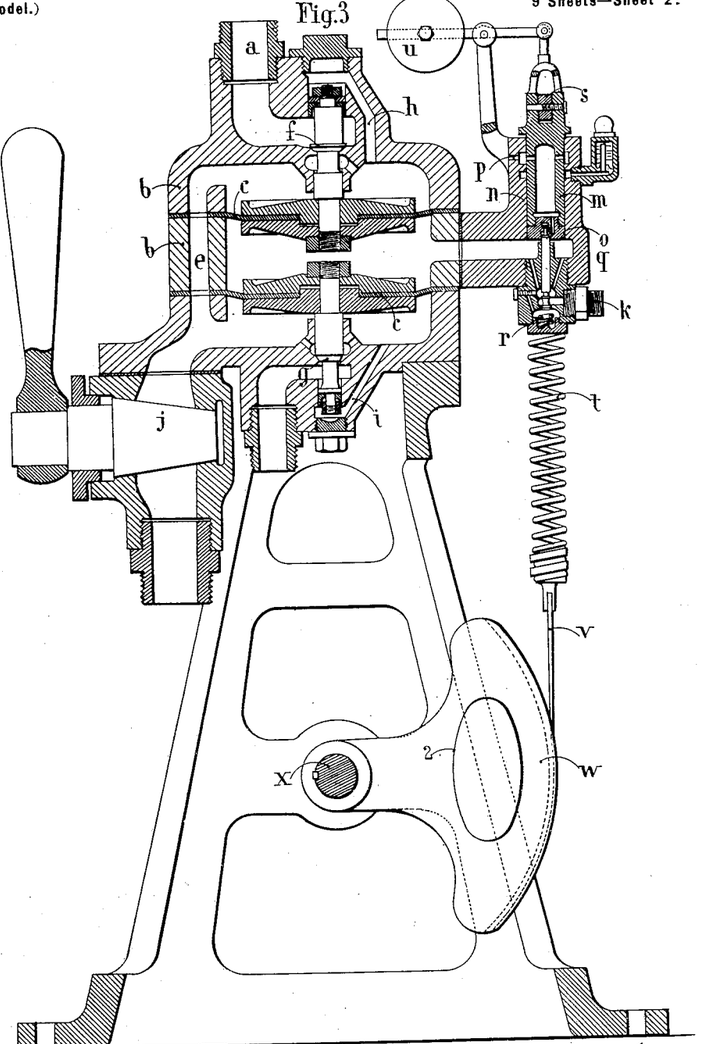
Fig. 3 is an axial vertical section of a transmitter.
Figure 4:
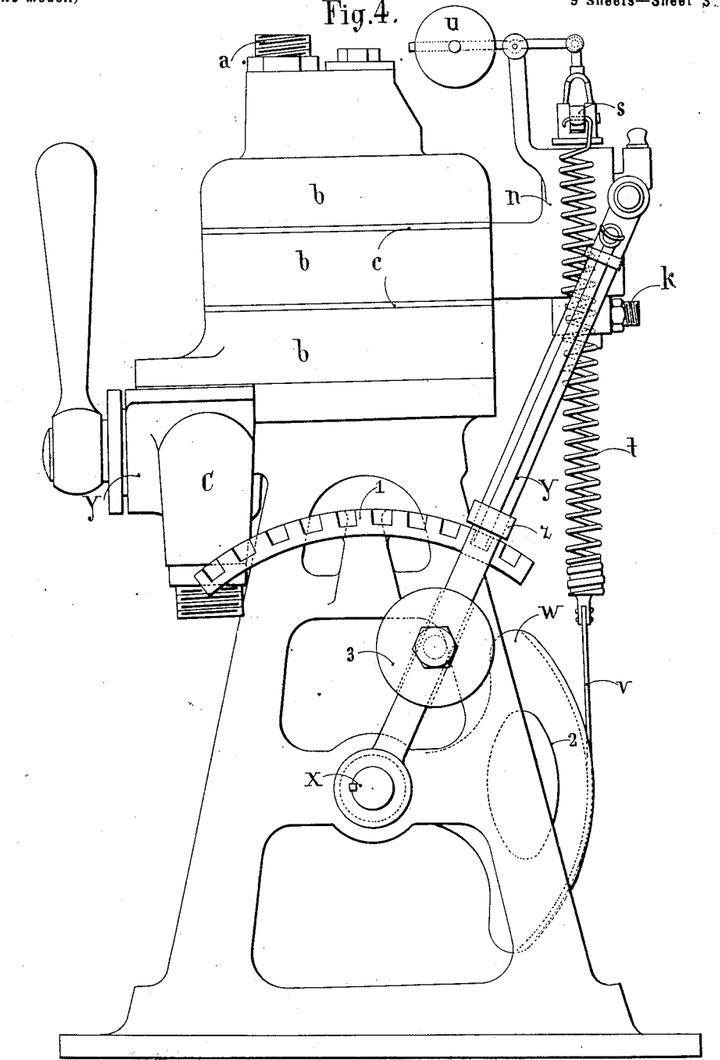
Fig. 4 is a corresponding elevation, and Fig. 5 a sectional elevation, of the same at right angles to Fig. 3.
Figure 5:
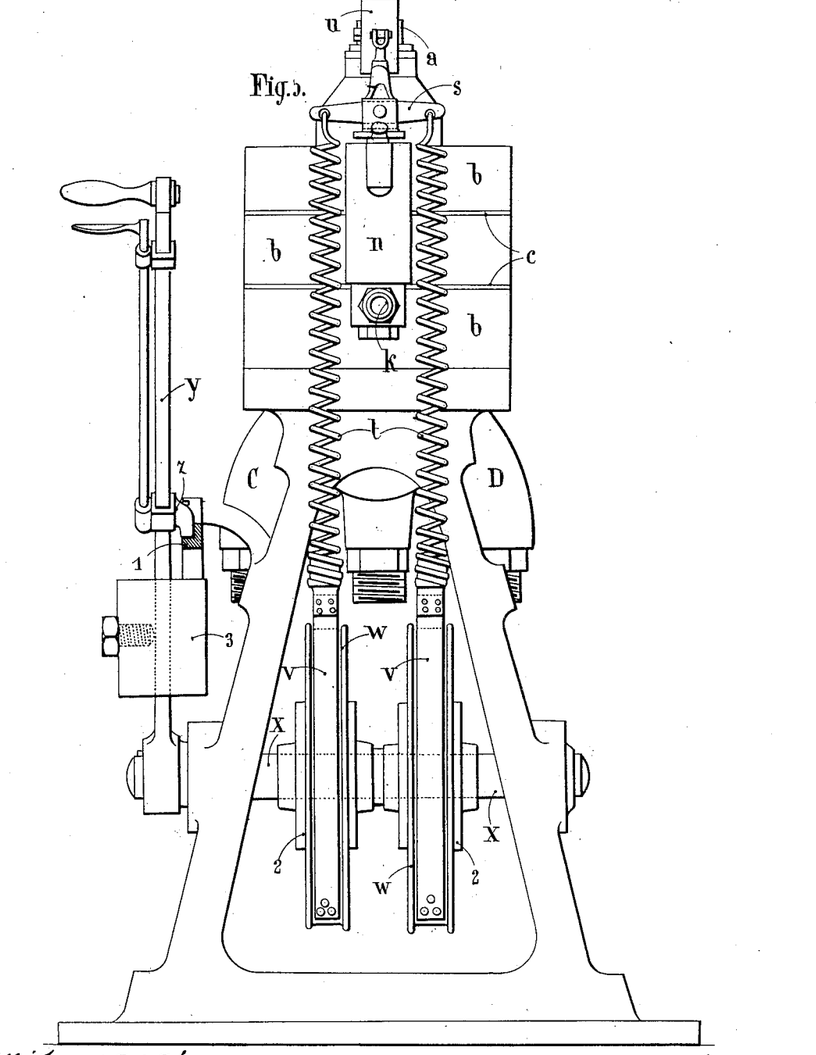

In Figs. 3, 4, and 5 is shown the transmitter A, which through a short coupling-tube $a$ communicates with any suitable air-containing reservoir, the air being compressed to about eight kilograms, its object being to send air at a predetermined pressure through either of the pipes or pipe systems C or D and to maintain such pressure at a constant degree irrespective of any lessening of pressure therein. The upper part of this transmitter consists of a case or chamber $b$, divided by two flexible membranes or diaphragms $c$ into three superposed compartments, the central compartment being entirely isolated from the upper and lower compartments, communicating with each other through the channel $e$. To the diaphragms $c$ there are suitably fitted two valves $f$ and $g$, both opening upward and balanced by means of the channels or ports $h$ and $i$, whereby their piston ends are connected with the interior of the chamber $b$ above and below the said diaphragms $c$. The valve $f$ provides for opening and closing communication between the chamber $b$ and the compressed-air reservoir via the junction or coupling tube $a$, while the valve $g$ serves to open and close communication between said chamber and the atmosphere. A four-way cock $j$, interposed between the chamber $b$ and the pipes C and D, enables either of the following communications to be established, viz: Pipe C to be put in connection with chamber $b$ and pipe D to communicate with the atmosphere, or pipe C to communicate with the atmosphere and pipe D to communicate with chamber $b$, or both these connections may be cut off, which last position of the cock would result in stoppage of the operation, while the first movement of the cock effects motion in one direction, for example, and the second adjustment of said cock gives motion in the opposite direction.

It will readily be seen that the pressure prevailing in the chamber or case $b$ outside the diaphragms $c$ must of necessity always be equal to that present between the said diaphragms, as if this should cease to be the case the equilibrium would be destroyed and either of the valves $f$ or $g$ would be raised from its seat. When once the pressure in the central part has been determined, it will be understood that a constant pressure will be produced and maintained in either of the pipes C or D, notwithstanding any lessening of the air-pressure in such pipes.

The central portion of the chamber $b$ communicates with the air-reservoir through the tube $k$ and through the medium of a pressure-relieving expansion-regulator. This regulator consists of a hollow piston $m$, adapted to move within a cylinder $n$ and having a passage or port $o'$ through its bottom $o$, controlled by a valve, to provide for placing the central compartment of the chamber in communication with the atmosphere, via a port or passage $o^3$ through said piston and its own chamber and an outlet or opening $p$ in said cylinder. The stem or rod $q$ of the valve $o^2$ is suitably guided within the casing of the regulator and carries a second valve $q'$, arranged at its lower end to cut off or restore communication between the central compartment or space between the two diaphragms $c$ and the tube $k$ of the compressed-air reservoir via passages or ports $q^3$, a spring $r$ tending constantly to keep the valve $q'$ down upon its lower seat. If nothing opposed the upward motion of the piston $m$, the pressure in said central space or compartment would always be proportionate to the weight of such piston. Suppose, for example, that the surface of the piston exposed to the pressure of the air contained in said central space were equal to ten square centimeters. Then the pressure per square centimeter would be equal to one-tenth of the thrust exerted by the piston $m$, for if such pressure should exceed that proportion the piston would be raised and the central space placed in communication with the atmosphere. If, however, such pressure should be less than such proportion, the preponderance of the thrust of the piston would force the valve stem or rod $q$ downward, and compressed air would be admitted into said central compartment. Therefore by varying the piston thrust, as presently described, we shall have either in one or the other of the pipes C D, as will readily be seen, a constant pressure equal to one-tenth of the thrust of the piston $m$. Hence in order to obtain pressures varying, say, between nothing and four kilograms in said pipes it is necessary to vary the thrust of the piston $m$ between nothing and forty kilograms. To effect this object, said piston is provided at its upper end with a cross-piece $s$, to which are connected the upper ends of two spiral springs $t$, counterbalanced by a counterpoise or weight $u$. To the lower part of each spring $t$ is connected a flexible steel band $v$, applied or connected to a segmental cam W, keyed upon a spindle or shaft X, actuated by a lever $y$, suitably secured to said shaft and arranged on one side of the apparatus. This lever is fitted with a bolt or detent $z$, capable of engaging any one of a series of, preferably, ten notches of a segmental rack 1. The tension of the springs $t$ and the arc of the movement of the cam W are such that when said bolt or detent $z$ of the lever $y$ is moved successively from notch to notch of said rack the pressure exerted upon the cross-piece $s$ is increased or decreased, according to the direction of the movement of said lever, by four kilograms. Each cam W has applied thereto a counterpoise or weight 2, and the lever $y$ has a similar weight 3 attached thereto. The cams W, together with their weights, jointly subject said springs to a stress or tension equal to twenty kilograms, while the counterpoise or weight 3 is inert when the lever is midway between the ends of its movements or stroke 8; but it takes away twenty kilograms at notch 0 and adds twenty kilograms at notch 10. The object of this arrangement is to reduce the pull exerted upon the lever $y$ in order to move it from one position to another, since when in each of these positions said counterpoises or weights 2 and 3 jointly counteract the tension of the springs $t$. On the whole, then, it will be seen that by operating the cock $j$ and placing the lever in any one of the notches of the rack a predetermined pressure may be maintained in either of the pipes C or D, such pressure remaining constant no matter what may be the variations of pressure in the pipes.

Figure 6:
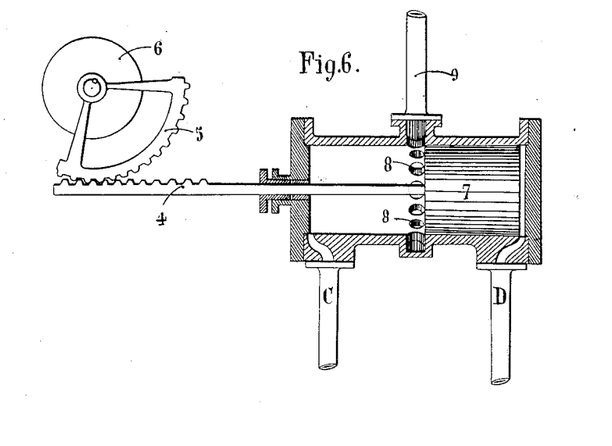
Fig. 6 is a partly sectional and side view of the reversing controller mechanism, including piston, rack-gear, &c.

The reversing piston mechanism shown in Fig. 6 comprises a piston 7, having its rod provided with a rack 4, engaging a toothed segment or sector 5, suitably secured or keyed to the shaft of a roll or drum 6, adapted to form the required connection between the induction-coils and armatures of the motors both for forward and rearward motion. The cylinder within which said piston 7 moves communicates at one end with the main forward-motion-transmitting pipe C and at the other end with the main rearward-motion-transmitting pipe D. When pressure is transmitted through the pipe C, the piston 7 is forced home to the end of its stroke and uncovers the orifices or ports 8 in the cylinder, which communicate through pipe 9 with the speed-notch indicator presently to be described. It will be understood that if the air had been brought up by the pipe D the piston 7 would have been driven to the opposite end of its stroke prior to uncovering the ports 8, and the rack 4, by moving the toothed segment 5, would have placed the piston in position for rearward motion.

Figure 7:
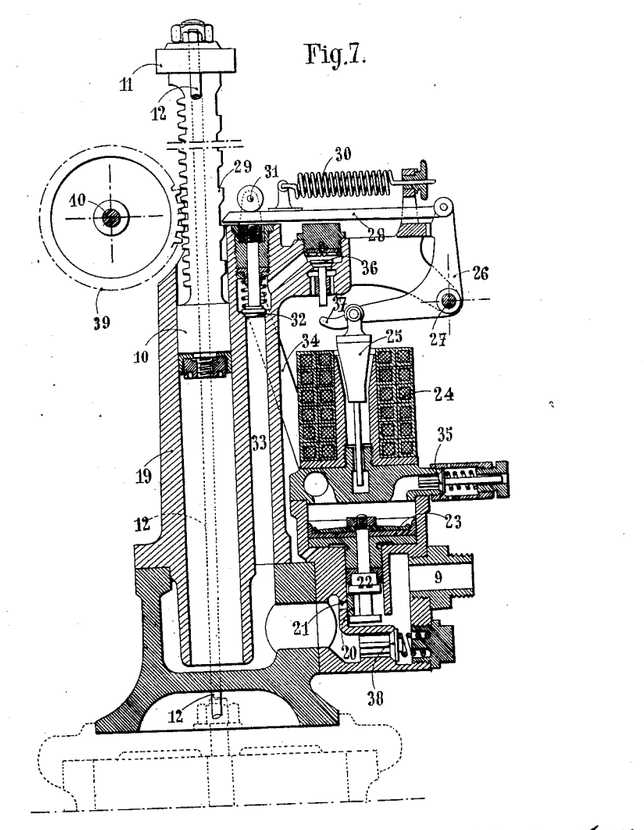
Figs. 7 and 8 are sectional views of the speed-indicator, Fig. 7 showing the upper part and Fig. 8 the lower part thereof.
Figure 8:
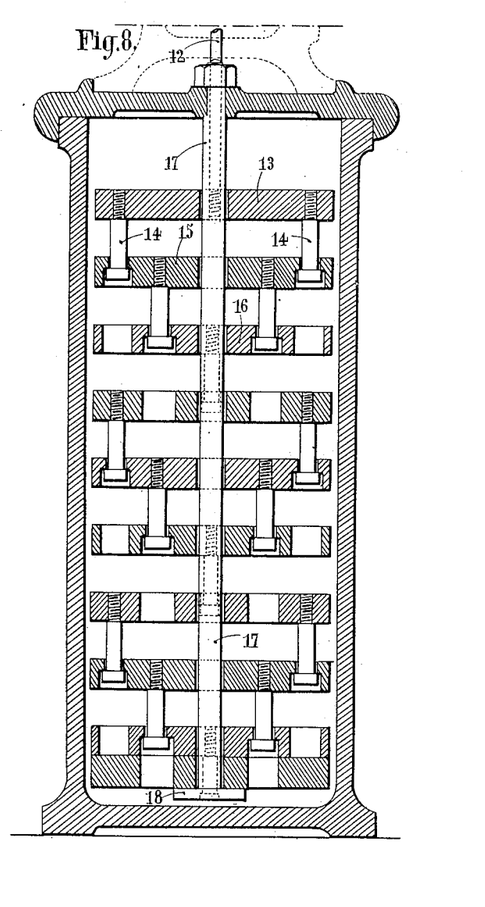

Referring more especially to Figs. 7 and 8, showing the speed-notch indicator, let it be supposed that the drum or roll 6 is capable of assuming ten different positions corresponding to the ten notches of the segment 1 besides the position of rest corresponding to total interruption of the current. Such roll or drum must be transferred from one position to the succeeding one suddenly, but not until after having been arrested for a time, so as to moderate the increase in the intensity of the current passing through the motors.

Figure 9:
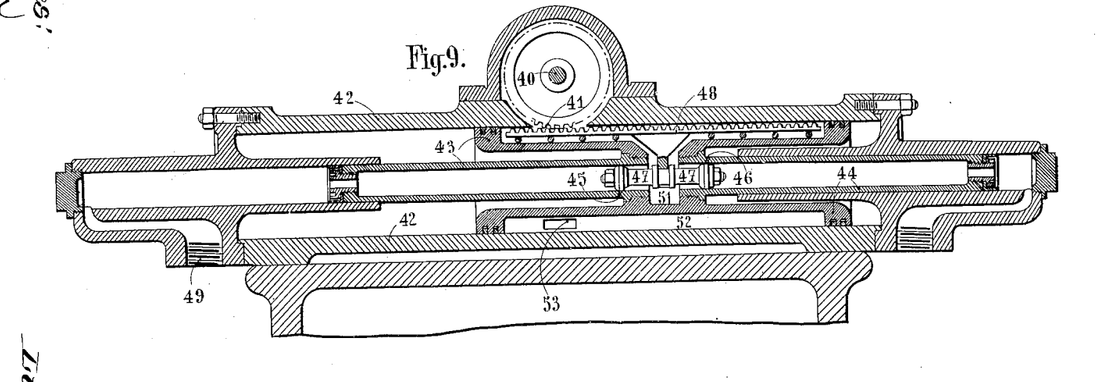
Figs. 9 and 10 represent the service-motor controlled by the speed-notch indicator and in turn controlling the transmitter, Fig. 9 being an axial vertical section of the motor-piston and Fig. 10 being a cross-section of the service-motor and oil-brake.
Figure 10:
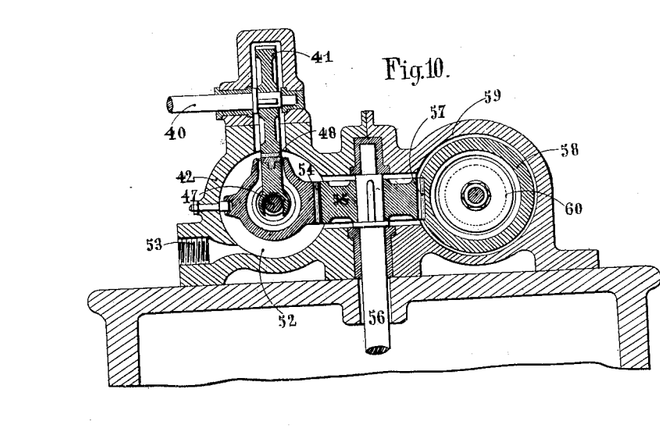

The speed-indicator mainly consists of a piston 10, the rod of which as it reciprocates works the "service-motor." (See Figs. 9 and 10.) To the extremity of the rod is attached a cross-piece or head 11, from which are suspended two rods 12, which raise the plate 13, Fig. 8, provided with screw-bolts 14, which are arranged to lift another plate 15 when the plate 13 has traveled a certain distance. This plate 15 in its turn will at the proper time likewise lift a plate 16, and so on. The number of these cast plates is equal to the number of notches in the segment 1—i. e., in this instance, ten. All the plates are guided by a central rod 17. The piston as it descends successively releases the ten plates, which come to rest upon the head 18 of the rod 17. The object of this arrangement is to permit the piston 10 to move intermittently, and it will remain in each of its balanced positions until the pressure within the cylinder 19 is sufficient to enable it to lift another plate. At that moment it will suddenly move a distance equal to the length of the screw-bolts 14, when it will be arrested by the weight of the next following plate, which it will not be capable of lifting until after the pressure within the cylinder 19 has risen to a predetermined degree. As the indicators of all the commutators are identical, all the pistons 10 will move simultaneously and in parallel directions. The cylinder 19ª, containing the plates 13 15, &c., is filled with oil to deaden the noise of the plates impinging upon each other. The cylinder 19 communicates with the compressed-air pipes through the tube 9. This communication is either opened or closed by a slide-valve 20, which uncovers or covers the port 21, as the case may be. The said slide-valve is controlled by a differential piston or stem 22 23, the object of which is to moderate the transmission of motion and to avoid any sudden overcharge of the electric motors. But for the presence of the piston 23 the compressed air, being delivered under the piston 22, would lift the slide-valve 20 and the piston 10 would rise intermittently, but too quickly, and there would be a risk of burning the motor-armatures. The duty of the piston 23 is to prevent the piston 10 from being lifted—i. e., to obviate an increase in the intensity of the current passing through the motors—as long as the train has not acquired a sufficient speed and as long as the current sent through the motors has not been diminished by the increased counter electromotive force. To this end the said piston 23 is controlled by an electromagnet 24, through which passes a derived or shunt current sent into the field-magnets. The armature 25 of this electromagnet is suspended from the end of a bell-crank lever 26, pivoted on the spindle 27, the other end of which bell-crank actuates a bolt or pawl 28, whereof the beak engages with the rod of the piston 10 in each of its balanced positions, said rod having for that purpose notches 29. A powerful spring 30 constantly tends to distend to disengage the bolt 28 from the piston-rod—that is to say, to lift the armature 25. The bolt 28 engages near its end under a roller frame or case 31, connected with the rod of a valve 32, which normally closes a conduit 33, opening into the cylinder 19. This valve is retained upon its seat by a suitably-weighted spring. The chamber of said valve 32 communicates, through a tube 34, with the chamber of the piston 23. The pressure in these chambers may not exceed a predetermined limit, owing to the provision of a spring-controlled valve 35. These chambers may be quickly placed in communication with the atmosphere by a valve 36, the rod of which is arranged above a small arm 37, carried by the bell-crank lever 26. A spring-controlled valve 38 is provided for the purpose of quickly placing the cylinder 19 in communication with the tube 9 whenever a sudden depression occurs in this tube, it being immaterial, so far as the operation of said valve is concerned, as relates to the position of the slide-valve 20 at the time.

Having thus described the construction of the apparatus, let us see how it will enable the attendant or driver to conduct the train. At the time of starting the driver pushes the lever $y$ over as far as it will go, so as to raise the pressure in either of the air-pipes C or D, as may be desired, to the maximum. As a result of this pressure, which is gradually added to through the port 21, the piston 10 begins to rise, raising the first plate 13, after which said piston is arrested for a time. The first movement of the piston 10 has brought the transmitter in its first position, say, in that where the electric current is allowed to pass through the field-magnets with the lowest force, the transmission between the rising movement of the said piston and the circular displacement of the axis 56 of the transmitter being obtained through the medium of a service-motor, hereinafter described. The train accordingly starts, while at the same time the electromagnet 24 attracts its armature 25 and the bolt 28 moves into position above the first of the notches 29. The air-pressure rapidly increases under the piston 10. Indeed it increases too rapidly and would tend, if not checked, to bring the transmitter too quickly to the position 2; but the moment the said piston commences to rise or ascend it lifts the bolt or detent 28, pivoting on the lever 26. At the same time an upward movement is imparted to the roller-frame or case 31, consequently lifting and unseating the valve 32. The air-pressure contained in the cylinder 19 passes through the channel 34, acting upon the piston 23, causing the slide-valve 20 to close. Hence piston 10 is maintained in its initial position so long as the hook or beak of the pawl 28 retains its position above the first notch 29, or, in other words, so long as the electromagnet 24 attracts its armature 25 with a force sufficient to overcome the resistance or action of the spring 30, which action is so regulated that the equilibrium shall be restored when the counter electromotive force has become sufficient to reduce the intensity of the current to a predetermined degree. The instant this result is attained the armature 25 rises somewhat, the attraction of the electromagnet decreases quickly, and the spring 30, as its pressure or force thus preponderates, suddenly retracts the pawl 28. At the same time the arm 37 engages the stem of the valve 36 with a force sufficient to unseat such valve, and thus to entirely remove air-pressure from the upper surface of the piston 23. The piston 22 will now once more lift the slide-valve 20, and air being again admitted to and raising the piston 10 another interval upward the transmitter will be moved to the position as indicated by 2. The same operations are repeated in respect of each of the ten notches of the transmitter in succession, so that the transmitter may reach the position indicated by 10 without the possibility of the current becoming sufficiently intense to endanger the motors being burned out. When the train has required a suitable or adequate speed, the attendant suitably manipulates the lever $y$ and engages its detent or pawl with the required notch of the segment 1, which would indicate the speed he would seem to likely maintain. He can of course change the position of the throttle or lever $y$ as occasion may require, accordingly as the road is level or slopes upward or downward at a greater or less angle.

To stop the train, it is only necessary to move the lever $y$ back to the zero position, when the air-pressure in the pipe system will instantly become exhausted, as also in the cylinder 19, via the valve 38. The piston 10 will descend, replacing each of the plates 13, &c., in succession in their normal position and restoring the transmitter to the zero position.

On the arrival of the train at the terminus of the route the cock $j$ is turned to the intermediate position, thereby cutting off all communication with the air-pressure, the lever $y$ being adjusted to the zero-notch. The motorman or attendant now proceeds to the opposite end of the train, (now the forward end,) where identical apparatus, as above disclosed, are arranged. I propose to fit the arrangement with an arresting-lock, whereof the key cannot be withdrawn unless the two levers have been brought to the position which neutralizes the operation of the transmitter, the motorman in that case having charge of such key, so that he may set the transmitter in operation at the opposite end of the train.

Figure 11:
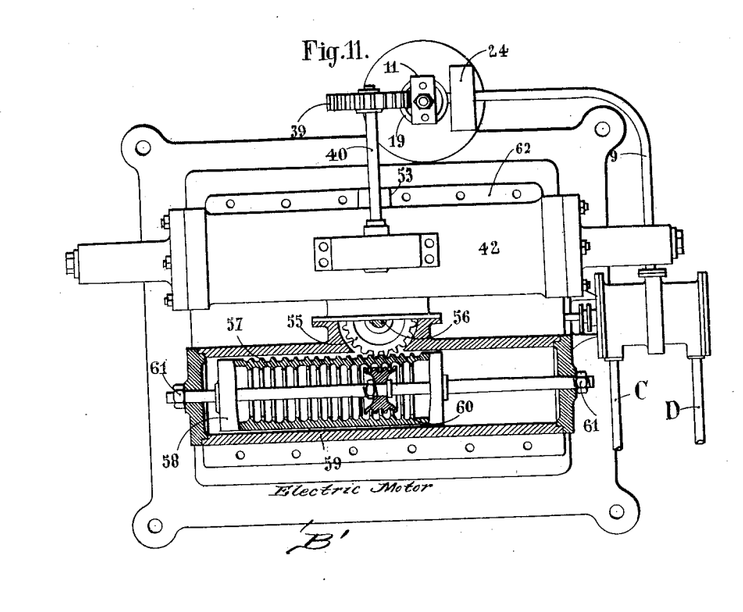
Fig. 11 is a partly plan and partly horizontal sectional view thereof.

In describing the service motor reference is had to Figs. 9, 10, and 11, which motor is controlled by the speed-notch indicator and itself adapted to operate the transmitter.

The transmitter of powerful motors necessary for working railways demands a somewhat considerable expenditure of power for their operation. This power cannot be derived from the motion of the piston 10 of the speed-notch indicator without fatally affecting the sensitiveness of this device. Some external force must therefore be resorted to, and this is derived from the compressed air contained in the reservoirs of the continuous brake mechanism arranged under each railway-carriage and fed from the main brake-pipe. Now the auxiliary or service motor has for its object to utilize such force, so as to move the transmitter in accordance with the indications of the rack of the piston of the speed-notch indicator. This rack gears with a wheel 39, rigidly mounted upon a spindle or shaft 40, arranged at the upper part of the transmitter. At its other end said shaft 40 carries a pinion 41, extending into the interior of a cylinder 42, said spindle ranging at right angles to the length of said cylinder. This cylinder is properly fastened in a frame supported by the transmitter and contains a traveling open-ended cylinder or piston-rod $42^a$, with its heads or pistons 43 44 peripherally engaging the inner circumference of the cylinder 42, the rods $42^b$ of which are hollow or form chambers having communication by suitable piping with the brake air-reservoir. (Not shown.) Within said hollow piston-rods $42^b$ is arranged a double or compound slide-valve 47, controlling ports or ducts 45 46 in the inner ends of said piston-rods 42, with its stem adapted to be engaged and itself actuated by a rack 48, engaged by the pinion 41, carried by the shaft 40, above referred to. The same air-pressure as prevails in the air-reservoirs of the air-brakes is constantly present in both of said hollow piston-rods 42$^b$, containing said slide-valve 47. Thus the said slide-valve is perfectly balanced and its actuation therefore requires the expenditure of but a very slight effort or force—such, for instance, as results from the intergearing or working of the rack and pinion 41 48, respectively, controlled by the shaft 40, which in turn is operated by the speed-notch indicator, as above stated.

From the foregoing it follows that when it is desired to effect a passage from one notch of the rack 48 to the succeeding one the shaft 40 is caused to suitably rotate with the pinion 41, the rotary movement of which will be converted into a longitudinal movement of the slide-valve 47.

Assuming now that the parts be moved toward the right-hand side of Fig. 9, as a result, the valve 47 being carried by the said parts, the ports 45 will open up communication with the pipe 49 of the air-reservoir through the medium of the hollow rod of the piston 43, and the compressed air coming from the brake-reservoirs of the railway-carriage will act upon the annular surface of the piston 43. Simultaneously communication will also be established between the space or compartment of the piston-chamber on the right-hand side of such piston and allow the confined air therein to escape via the opening 51, connecting the valve-chamber and the annular space 52 between the pistons, their rods, and the cylinder 42, said air finally passing out through the passage 53. Both pistons 43 and 44 will in consequence be effectively driven toward the right-hand side and turn a vertical shaft 56 (shown in Fig. 10) through the agency of the intergeared rack 54 and wheel 55, said rack being carried in connection with said pistons and said shaft actuating a drum. (Not shown.) When the wheel 41 stops at a predetermined notch, the rack 48 and the distributing-valve 47 are also arrested. The double piston 43 44, however, will continue its stroke under the impact of its momentum and automatically reverse the direction of the compressed-air supply or feed through the ports 45 and 46, ports 45 serving as outlet-ports and 46 as inlet-ports. The motion is in consequence instantly stopped and said piston caused to return to its stopping position, which is aided by the relative position of the distributing-valve 47. To obviate any oscillation to either side from such stopping position, the toothed wheel 55 is made to gear, on the opposite side of the rack 54, with another rack 57, Fig. 10, provided on the oil-brake. This brake consists of a cylinder 58, suitably guided by a preferably cast-iron casing 59, integral with the main frame of the apparatus. This cylinder contains a stationary piston 60, carried by a rod 60$^a$, passing through said cylinder and secured to the machine-frame by means of nuts 61, screwed to the ends of said rod. This cylinder 58 is filled with oil, which, owing to the space or clearance between said piston 60 and said cylinder, is permitted to pass from side to side of said piston. This oil-brake is not intended to operate continuously, but so as to allow the wheel 55 rapidly and freely to revolve from one notch to the other and not to exert any braking action until such wheel assumes one of the positions corresponding to a speed-operating notch. To insure such interrupted action of said oil-brake, equidistant grooves are provided in the inner surface of the cylinder 58 and corresponding grooves in the outer surface of the stationary piston 60. When the wheel 55 arrives at a stopping-point, the ribs formed by the grooves of the stationary piston 60 will come opposite the ribs formed by the grooves of the cylinder 58, whereby the space or passage provided for the passage of the oil is almost entirely obstructed. In all intermediate positions the ribs of the piston are opposite the grooves of the cylinder, whereby is provided a wide open sinuous passage to allow the oil to freely pass from side to side of the piston.

All accessory features may vary without departing from the principle of the invention.

Having now particularly described and ascertained the nature of this invention and in what manner the same is to be performed, I declare that what I claim is—

1. In electric traction-railways, the combination of an electric motor, compressed-air pipes one of which serves for forward motion and the other for rearward motion a transmitter for maintaining constant pressure in one of said pipes, said transmitter having its throttle-lever adapted to engage a rack or notched bar, a reversing-piston alternately acted upon by said pressure, a second piston, also actuated by the pressure from said transmitter, a series of freely-movable heavy bodies or plates actuated by said second piston an electrical controlling device for said second piston, and an auxiliary compressed-air motor, fitted with a brake, substantially as described.

2. In apparatus of the character described, the combination of an electric motor, compressed-air pipes, an air-pressure transmitter comprising a chamber and divided into three compartments by membranes or flexible diaphragms, the central compartment being independent of the other compartments and the latter connected together and with one of said air-pipes, means for controlling communication between said latter compartments and said air-pipe, means for the retention of the throttle-lever of said transmitter as described, a reversing-piston alternately actuated by the pressure from said transmitter, a second piston also subjected to the pressure from said transmitter, movable weights or plates actuated by said second piston, an auxiliary compressed-air motor fitted with a brake, substantially as set forth.

3. In apparatus of the character described, the combination of an electric motor, compressed-air pipes, an air-pressure transmitter, comprising a chamber subdivided into several compartments by membranes or flexible diaphragms, the central compartment being independent of the other compartments and the latter connected together and with one of said air-pipes, and a pressure-regulator adapted to maintain a predetermined constant pressure within the central compartment, substantially as set forth.

4. In apparatus of the character described, the combination of an electric motor, compressed-air pipes, an air-pressure transmitter, comprising a chamber subdivided into a number of compartments, the central one being independent of the other compartments, and the latter connected together and with one of said air-pipes, and a pressure-regulator, adapted to maintain a predetermined constant pressure within the central compartment, comprising a piston, having connected thereto a spring suitably held in place, a counterpoise or weight adapted to counterbalance the tension of said spring and means effecting connection between said spring and the "throttle-lever" of said transmitter, substantially as set forth.

5. In apparatus of the character described, the combination of an electric motor, compressed-air pipes, an air-pressure transmitter subdivided into a number of compartments, the central one being independent of the other compartments and the latter connected together and with one of said pipes, a pressure-regulator adapted to maintain a predetermined constant pressure within the central compartment, comprising a piston having a cross-piece to which are connected springs, a counterpoise or weight adapted to counterbalance the tension of said springs, segments carried by the pivot of the "throttle-lever" of said transmitter, said springs having flexible band connections with said segments, and means for the predetermined retention in position of said "throttle-lever," substantially as specified.

6. In apparatus of the character described, the combination of an electric motor, compressed-air pipes, an air-pressure transmitter, subdivided into a number of compartments, the central one being independent of the other compartments and the latter connected together and with one of said pipes, a pressure-regulator adapted to maintain a predetermined constant pressure within the central compartment, comprising a piston having springs connected thereto, a counterpoise or weight adapted to the tension of said springs, segments carried by the pivot of the transmitter "throttle-lever," said springs having flexible band connections with said segments, and a pressure-regulating valve adapted to control the pressure between said central compartment of the transmitter and the air-reservoir, substantially as set forth.

7. In apparatus of the character described, the combination of an electric motor, compressed-air pipes, a transmitter, a pressure-actuated piston arranged in connection with said air-pipes and electrical current-controlling mechanism, comprising a cylinder having a piston and about centrally having pipe connection with the chamber of said pressure-actuated piston, and with its ends connected to said air-pipes, a rotary drum or roller adapted to form connection between the induction-coils and armatures of said electric motor, and intermediate motion-transmitting mechanism between the piston of said cylinder and said rotary drum, substantially as set forth.

8. In apparatus of the character described, the combination of an electric motor, compressed-air pipes, a transmitter, an air-pressure-actuated piston arranged in connection with said air-pipes, and electrical current-controlling mechanism comprising a cylinder having a piston and about centrally having pipe connection with the chamber of said pressure-actuated piston, and with its ends connected to said air-pipes, a rotary drum or roller adapted to form connection between the induction-coils and armatures of said electric motor, said cylinder piston-rod and drum-shaft being intergeared, substantially as set forth.

9. In apparatus of the character described, the combination of an electric motor, a transmitter, compressed-air pipes connected to said transmitter, and a speed-indicator comprising an air-pressure-actuated piston connected up with said air-pipes, a plurality or series of weights loosely arranged on bolts or stems, and rods adapted to be carried by said piston and connected up with said loosely-arranged weights, substantially as set forth.

10. In apparatus of the character described, the combination of an electric motor, a transmitter, compressed-air pipes connected to said transmitter, and a speed-indicator comprising an air-pressure-actuated piston connected up with said air-pipes, a plurality or series of weights loosely arranged upon bolts or stems, rods carried by said piston and connected up with said loosely-arranged weights, an electromagnet, a bell-crank lever controlled by said magnet, and having a pawl or detent adapted to engage said piston, means to normally effect such engagement of said pawl a differential valve and air-inlet valve controlled thereby, and a third valve controlled by said pawl and adapted to establish communication between the chambers of said piston and differential valve and the atmosphere, substantially as set forth.

11. In apparatus of the character described, the combination of an electric motor, a transmitter, compressed-air pipes connected to said transmitter, and a speed-indicator comprising an air-pressure-actuated piston connected up with said air-pipes, a series of weights loosely arranged upon bolts or stems, rods carried by said piston and connected up with said loosely-arranged weights, an electromagnet, a bell-crank lever controlled by said magnet and having a pawl or detent adapted to engage said piston, a spring to effect such engagement of said pawl with said piston, a valve adapted to be controlled by said pawl or detent, a differential valve and an inlet-valve controlled thereby, and an exhaust-valve, said detent-controlled valve adapted to establish communication between the chambers of said differential valve and piston and the atmosphere, substantially as set forth.

12. In apparatus of the character described, the combination of an electric motor, a transmitter, compressed-air pipes connected to said transmitter, an air-pressure-controlled piston also adapted to be actuated by air-pressure and an auxiliary or "service" motor comprising a cylinder, its double piston having tubular or hollow rods, adapted to receive air from the air-brake reservoir, said hollow piston having two series of air passages or ports, and a double-acting slide-valve arranged in the chambers of said pistons and adapted to control said two series of air passages or ports and, itself, controlled by said air-pressure-controlled piston, substantially as set forth.

13. In apparatus of the character described, the combination of an electric motor, a transmitter, compressed-air pipes connected to said transmitter, an air-pressure-controlled piston also adapted to be actuated by air-pressure, an auxiliary or "service" motor comprising a cylinder, its double piston having tubular piston-rods adapted to receive air from the air-brake reservoir, said hollow piston having two series of air passages or ports, a double-acting slide-valve arranged in the chambers of said pistons and adapted to control said two series of passages or ports and itself, controlled by said air-pressure-controlled piston, and a brake comprising a circumferentially grooved or ribbed cylinder adapted to be engaged by a rack on said hollow or tubular piston, a peripherally ribbed or grooved disk or piston suitably fixed in position and adapted to engage the inner circumference of said ribbed or grooved cylinder, said cylinder adapted to contain a liquid, substantially as described.

In testimony whereof I have hereunto set my hand in presence of two subscribing witnesses.

LUCIEN GENTY.

Witnesses:
ALLAN MACFARLANE,
R. K. FAST.